US011211625B2

(12) United States Patent
Ghezel-Ayagh (10) Patent No.: US 11,211,625 B2
(45) Date of Patent: Dec. 28, 2021

(54) MOLTEN CARBONATE FUEL CELL ANODE EXHAUST POST-PROCESSING FOR CARBON DIOXIDE

(71) Applicant: FuelCell Energy, Inc., Danbury, CT (US)

(72) Inventor: Hossein Ghezel-Ayagh, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 180 days.

(21) Appl. No.: 16/095,261

(22) PCT Filed: Apr. 20, 2017

(86) PCT No.: PCT/US2017/028594
§ 371 (c)(1),
(2) Date: Oct. 19, 2018

(87) PCT Pub. No.: WO2017/184848
PCT Pub. Date: Oct. 26, 2017

(65) Prior Publication Data
US 2019/0140295 A1 May 9, 2019

Related U.S. Application Data

(60) Provisional application No. 62/325,711, filed on Apr. 21, 2016.

(51) Int. Cl.
*H01M 8/0668* (2016.01)
*B01D 53/047* (2006.01)
(Continued)

(52) U.S. Cl.
CPC ........ *H01M 8/0668* (2013.01); *B01D 53/047* (2013.01); *B01D 53/263* (2013.01);
(Continued)

(58) Field of Classification Search
None
See application file for complete search history.

(56) References Cited

U.S. PATENT DOCUMENTS 4,449,994 A   5/1984   Hegarty et al.
4,476,633 A   10/1984  Shah et al.
(Continued)

FOREIGN PATENT DOCUMENTS

CA        2956439        4/2017
CN     101809396 A       8/2010
(Continued)

OTHER PUBLICATIONS

Anonymous: 11 PROX—Wikipedia, Dec. 29, 2015 (Dec. 29, 2015), XP055569545, Retrieved from the Internet: URL:https://en.wikipedia.org/w/index.php?title=PROX&oldid=697317259 [retrieved on Mar. 14, 2019].
(Continued)

*Primary Examiner* — Basia A Ridley
*Assistant Examiner* — Heng M. Chan
(74) *Attorney, Agent, or Firm* — Foley & Lardner LLP (57) ABSTRACT

A fuel cell system includes a first fuel cell having a first anode and a first cathode, wherein the first anode is configured to output a first anode exhaust gas. The system further includes a first oxidizer configured to receive the first anode exhaust gas and air from a first air supply, to react the first anode exhaust gas and the air in a preferential oxidation reaction, and to output an oxidized gas. The system further includes a second fuel cell configured to act as an electrochemical hydrogen separator. The second fuel cell includes a second anode configured to receive the oxidized gas from the first oxidizer and to output a second anode exhaust gas, and a second cathode configured to output a hydrogen stream. The system further includes a condenser configured (Continued)

to receive the second anode exhaust gas and to separate water and $CO_2$.

8 Claims, 4 Drawing Sheets

(51) Int. Cl.

| | | |
|---|---|---|
| *H01M 8/04014* | (2016.01) | |
| *H01M 8/04089* | (2016.01) | |
| *B01D 53/32* | (2006.01) | |
| *H01M 8/04119* | (2016.01) | |
| *H01M 8/04828* | (2016.01) | |
| *H01M 8/0662* | (2016.01) | |
| *B01D 53/26* | (2006.01) | |
| *H01M 8/0612* | (2016.01) | |
| *H01M 8/14* | (2006.01) | |

(52) U.S. Cl.
CPC ...... *B01D 53/326* (2013.01); *H01M 8/04014* (2013.01); *H01M 8/04022* (2013.01); *H01M 8/04097* (2013.01); *H01M 8/04164* (2013.01); *H01M 8/04828* (2013.01); *H01M 8/0612* (2013.01); *H01M 8/0662* (2013.01); *H01M 8/0681* (2013.01); *B01D 2256/22* (2013.01); *B01D 2257/108* (2013.01); *B01D 2257/80* (2013.01); *H01M 2008/147* (2013.01); *Y02C 20/40* (2020.08)

(56) References Cited

U.S. PATENT DOCUMENTS

| | | | |
|---|---|---|---|
| 4,476,683 A | | 10/1984 | Shah et al. |
| 4,532,192 A | * | 7/1985 | Baker .................. C25B 1/02 429/411 |
| 4,828,940 A | | 5/1989 | Cohen et al. |
| 5,518,828 A | | 5/1996 | Senetar |
| 6,063,515 A | | 5/2000 | Epp et al. |
| 6,162,556 A | | 12/2000 | Vollmar et al. |
| 6,280,865 B1 | | 8/2001 | Eisman et al. |
| 6,517,963 B2 | | 2/2003 | Lakshmanan et al. |
| 6,660,069 B2 | | 12/2003 | Sato et al. |
| 6,821,664 B2 | | 11/2004 | Parks et al. |
| 6,833,207 B2 | | 12/2004 | Joos et al. |
| 6,866,950 B2 | | 3/2005 | Connor et al. |
| 6,887,601 B2 | | 5/2005 | Moulthrop et al. |
| 6,924,053 B2 | | 8/2005 | McElroy |
| 6,994,929 B2 | | 2/2006 | Barbir et al. |
| 7,011,903 B2 | | 3/2006 | Benson et al. |
| 7,014,940 B2 | | 3/2006 | Hase et al. |
| 7,041,272 B2 | | 5/2006 | Keefer et al. |
| 7,045,233 B2 | | 5/2006 | McElroy et al. |
| 7,097,925 B2 | | 8/2006 | Keefer |
| 7,132,182 B2 | | 11/2006 | Mcelroy et al. |
| 7,141,323 B2 | | 11/2006 | Ballantine et al. |
| 7,255,949 B2 | | 8/2007 | Coors et al. |
| 7,276,306 B2 | | 10/2007 | Pham et al. |
| 7,285,350 B2 | | 10/2007 | Keefer et al. |
| 7,416,800 B2 | | 8/2008 | Benson et al. |
| 7,482,078 B2 | | 1/2009 | Sridhar et al. |
| 7,520,916 B2 | | 4/2009 | McElroy et al. |
| 7,591,880 B2 | | 9/2009 | Levan et al. |
| 7,601,207 B2 | | 10/2009 | Moulthrop et al. |
| 7,604,684 B2 | | 10/2009 | Menzel |
| 7,674,539 B2 | | 3/2010 | Keefer et al. |
| 7,691,507 B2 | | 4/2010 | Ballantine et al. |
| 7,752,848 B2 | | 7/2010 | Balan et al. |
| 7,833,668 B2 | | 11/2010 | Ballantine et al. |
| 7,846,599 B2 | | 12/2010 | Ballantine et al. |
| 7,883,803 B2 | | 2/2011 | McElroy et al. |
| 7,968,237 B2 | | 6/2011 | Grieve et al. |
| 8,062,799 B2 | | 11/2011 | Jahnke et al. |
| 8,071,241 B2 | | 12/2011 | Sridhar et al. |
| 8,101,307 B2 | | 1/2012 | Mcelroy et al. |
| 8,158,290 B2 | | 4/2012 | Penev et al. |
| 8,241,400 B2 | | 8/2012 | Grover |
| 8,293,412 B2 | | 10/2012 | Mcelroy |
| 8,343,671 B2 | | 1/2013 | Qi |
| 8,530,101 B2 | | 9/2013 | Qi |
| 8,790,618 B2 | | 7/2014 | Adams et al. |
| 8,815,462 B2 | | 8/2014 | Ghezel-Ayagh et al. |
| 9,315,397 B2 | | 4/2016 | Sivret |
| 9,365,131 B2 | | 6/2016 | Jamal et al. |
| 9,455,458 B2 | | 9/2016 | Yu et al. |
| 9,455,463 B2 | | 9/2016 | Berlowitz et al. |
| 9,499,403 B2 | | 11/2016 | Al-Muhaish et al. |
| 9,502,728 B1 | | 11/2016 | Farooque et al. |
| 9,520,607 B2 | | 12/2016 | Berlowitz et al. |
| 9,531,024 B2 | | 12/2016 | Pollica et al. |
| 9,586,171 B2 | | 3/2017 | Vanzandt et al. |
| 9,861,931 B2 | | 1/2018 | Kuopanportti et al. |
| 2002/0142198 A1 | | 10/2002 | Towler et al. |
| 2003/0143448 A1 | * | 7/2003 | Keefer .............. H01M 8/04231 429/9 |
| 2003/0157383 A1 | | 8/2003 | Takahashi |
| 2003/0207161 A1 | | 11/2003 | Rusta-Sallehy et al. |
| 2004/0028979 A1 | | 2/2004 | Ballantine et al. |
| 2004/0146760 A1 | | 7/2004 | Miwa |
| 2004/0166384 A1 | | 8/2004 | Schafer |
| 2004/0197612 A1 | | 10/2004 | Keefer et al. |
| 2004/0221578 A1 | | 11/2004 | Iijima et al. |
| 2004/0229102 A1 | | 11/2004 | Jahnke et al. |
| 2005/0003247 A1 | | 1/2005 | Pham |
| 2005/0074657 A1 | | 4/2005 | Rusta-Sallehy et al. |
| 2005/0098034 A1 | | 5/2005 | Gittleman et al. |
| 2005/0123810 A1 | | 6/2005 | Balan |
| 2005/0227137 A1 | | 10/2005 | Suga |
| 2005/0233188 A1 | | 10/2005 | Kurashima et al. |
| 2005/0271914 A1 | | 12/2005 | Farooque et al. |
| 2006/0115691 A1 | | 6/2006 | Hilmen et al. |
| 2006/0188761 A1 | | 8/2006 | O'Brien et al. |
| 2007/0009774 A1 | | 1/2007 | Clawson et al. |
| 2007/0031718 A1 | | 2/2007 | Fujimura et al. |
| 2007/0044657 A1 | | 3/2007 | Laven et al. |
| 2007/0065688 A1 | | 3/2007 | Shimazu et al. |
| 2007/0111054 A1 | | 5/2007 | Gottmann et al. |
| 2007/0141409 A1 | | 6/2007 | Cho et al. |
| 2007/0193885 A1 | | 8/2007 | Benicewicz et al. |
| 2007/0243475 A1 | | 10/2007 | Funada et al. |
| 2007/0246363 A1 | | 10/2007 | Eisman et al. |
| 2007/0246374 A1 | | 10/2007 | Eisman et al. |
| 2008/0063910 A1 | | 3/2008 | Okuyama et al. |
| 2008/0171244 A1 | | 7/2008 | Okuyama et al. |
| 2008/0241612 A1 | | 10/2008 | Ballantine et al. |
| 2008/0241638 A1 | | 10/2008 | McElroy et al. |
| 2008/0245101 A1 | | 10/2008 | Dubettier-Grenier et al. |
| 2008/0292921 A1 | | 11/2008 | Lakshmanan et al. |
| 2008/0299425 A1 | | 12/2008 | Kivisaari et al. |
| 2008/0311445 A1 | | 12/2008 | Venkataraman et al. |
| 2009/0068512 A1 | | 3/2009 | Gofer et al. |
| 2009/0084085 A1 | | 4/2009 | Kawai |
| 2009/0155637 A1 | | 6/2009 | Cui et al. |
| 2009/0155644 A1 | | 6/2009 | Cui et al. |
| 2009/0155645 A1 | | 6/2009 | Cui et al. |
| 2009/0155650 A1 | | 6/2009 | Cui et al. |
| 2009/0186244 A1 | | 7/2009 | Mayer |
| 2010/0028730 A1 | | 2/2010 | Ghezel-Ayagh |
| 2010/0047641 A1 | | 2/2010 | Jahnke et al. |
| 2010/0104903 A1 | | 4/2010 | Gummalla et al. |
| 2010/0126180 A1 | | 5/2010 | Forsyth et al. |
| 2010/0199559 A1 | | 8/2010 | Hallett et al. |
| 2010/0239924 A1 | | 9/2010 | Mcelroy et al. |
| 2010/0243475 A1 | | 9/2010 | Eisman et al. |
| 2010/0266923 A1 | | 10/2010 | Mcelroy et al. |
| 2010/0279181 A1 | | 11/2010 | Adams et al. |
| 2012/0000243 A1 | | 1/2012 | Bough et al. |
| 2012/0034538 A1 | | 2/2012 | Jahnke et al. |
| 2012/0058042 A1 | | 3/2012 | Zauderer |
| 2012/0167620 A1 | | 7/2012 | Van Dorst et al. |
| 2012/0189922 A1 | | 7/2012 | Schmidt et al. |
| 2012/0291483 A1 | | 11/2012 | Terrien et al. |
| 2013/0014484 A1 | | 1/2013 | Caprile et al. |

(56) References Cited

U.S. PATENT DOCUMENTS

| | | |
|---|---|---|
| 2013/0111948 A1 | 5/2013 | Higginbotham |
| 2013/0259780 A1 | 10/2013 | Handagama et al. |
| 2014/0260310 A1 | 9/2014 | Berlowitz et al. |
| 2014/0302413 A1 | 10/2014 | Berlowitz |
| 2014/0329160 A1 | 11/2014 | Ramaswamy et al. |
| 2014/0352309 A1 | 12/2014 | Kim et al. |
| 2015/0089951 A1 | 4/2015 | Barckholtz et al. |
| 2015/0111160 A1 | 4/2015 | Brunhuber et al. |
| 2015/0122122 A1 | 5/2015 | W Mustapa et al. |
| 2015/0191351 A1 | 7/2015 | Darde et al. |
| 2015/0266393 A1 | 9/2015 | Jamal et al. |
| 2015/0280265 A1 | 10/2015 | Mclarty |
| 2016/0248110 A1 | 8/2016 | Ghezel-Ayagh |
| 2016/0265122 A1 | 9/2016 | Zhu et al. |
| 2016/0351930 A1 | 12/2016 | Jahnke et al. |
| 2016/0365590 A1 | 12/2016 | Zheng et al. |
| 2016/0365594 A1 | 12/2016 | Zheng et al. |
| 2017/0130582 A1 | 5/2017 | Hsu |
| 2017/0141421 A1 | 5/2017 | Sundaram et al. |
| 2017/0250429 A1* | 8/2017 | Diethelm ............ H01M 8/0668 |

FOREIGN PATENT DOCUMENTS

| | | | |
|---|---|---|---|
| CN | 102422108 A | 4/2012 | |
| CN | 104847424 A | 8/2015 | |
| CN | 105050945 A | 11/2015 | |
| EP | 1 306 916 A1 | 5/2003 | |
| EP | 1 790 027 A2 | 5/2007 | |
| EP | 2 589 902 A2 | 5/2013 | |
| EP | 1 841 515 B1 | 6/2016 | |
| EP | 2 011 183 B1 | 6/2016 | |
| EP | 1 996 533 B1 | 7/2016 | |
| EP | 1 273 061 B1 | 8/2016 | |
| EP | 1 344 270 B1 | 6/2017 | |
| EP | 2 589 908 A2 | 8/2018 | |
| EP | 3 360 189 A1 | 8/2018 | |
| IT | 102009901749803 A1 | 1/2011 | |
| IT | MI20091246.6 A1 | 1/2011 | |
| JP | 02-281569 | 11/1990 | |
| JP | 41-1312527 A | 11/1999 | |
| JP | 11312527 A * | 11/1999 | |
| JP | 2001-023670 A | 1/2001 | |
| JP | 2002-334714 A | 11/2002 | |
| JP | 2004-171802 | 6/2004 | |
| JP | 2005-179083 | 7/2005 | |
| JP | 2007-018907 A | 1/2007 | |
| JP | 2007-201349 A | 8/2007 | |
| JP | 2008-507113 A | 3/2008 | |
| JP | 2009-503790 | 1/2009 | |
| JP | 2010-055927 A | 3/2010 | |
| JP | 2010-228963 A | 10/2010 | |
| JP | 2011-141967 A | 7/2011 | |
| JP | 2011-181440 A | 9/2011 | |
| JP | 2012-519649 A | 8/2012 | |
| JP | 2012-531719 | 12/2012 | |
| JP | 2016-115479 A | 6/2016 | |
| KR | 1020130075492 A | 7/2013 | |
| WO | WO-2007/015689 A2 | 2/2007 | |
| WO | WO-2009/013455 A2 | 1/2009 | |
| WO | WO-2009/059571 A1 | 5/2009 | |
| WO | WO-2011/089382 A2 | 7/2011 | |
| WO | WO-2012/1 76176 A1 | 12/2012 | |
| WO | WO-2014/151207 | 9/2014 | |
| WO | WO-2015/059507 A1 | 4/2015 | |
| WO | WO-201 5/116964 A1 | 8/2015 | |
| WO | WO-2015/124183 A1 | 8/2015 | |
| WO | WO-2015/124700 A1 | 8/2015 | |
| WO | WO-2015124700 A1 * | 8/2015 | ............ C01B 3/503 |
| WO | WO-201 5/133757 A1 | 9/2015 | |
| WO | WO-201 6/100849 A1 | 6/2016 | |
| WO | WO-201 6/196952 A1 | 12/2016 | |
| WO | WO-2019/175850 A1 | 9/2019 | |

OTHER PUBLICATIONS

Extended European Search Report in EP17786629.0 dated Mar. 26, 2019 (9 pages).
First Office Action in JP 2018-555215 dated Dec. 20, 2019, with English machine translation (8 pages).
International Search Report and Written Opinion dated Aug. 24, 2017 in PCT/US2017/028594 (13 pages).
Notice of Preliminary Rejection in KR 10-2018-7033320 dated Apr. 17, 2020, with English translation (15 pages).
Extended European Search Report in EP21154960.5 dated May 17, 2021 (9 pages).
Communication pursuant to Article 94(3) EPC in EP 17786599.5 dated Jan. 30, 2020 (6 pages).
Extended European Search Report for EP17786599.5 dated May 20, 2019 (7 pages).
Extended European Search Report in EP17790107.1 dated Nov. 29, 2019 (7 pages).
First Office Action in JP 2018-554735 dated Nov. 11, 2019, with English translation (8 pages).
First Office Action in JP 2018-556825 dated Feb. 25, 2020, with English translation (14 pages).
International Preliminary Report on Patentability in PCT/US2016/035745 dated Dec. 14, 2017 (7 pages).
International Preliminary Report on Patentability in PCT/US2017/027261 dated Nov. 8, 2018 (8 pages).
International Preliminary Report on Patentability in PCT/US2017/028487 dated Oct. 23, 2018 (8 pages).
International Preliminary Report on Patentability in PCT/US2017/029667 dated Nov. 8, 2018 (6 pages).
International Search Report and Written Opinion dated Jul. 14, 2017 for PCT/US2017/029667 (7 pages).
International Search Report and Written Opinion in PCT/US2016/035745 dated Sep. 30, 2016 (10 pages.
International Search Report and Written Opinion in PCT/US2017/027261 dated Jul. 3, 2017 (10 pages).
International Search Report and Written Opinion in PCT/US2017/028487 dated Jul. 10, 2017 (8 pages).
International Search Report and Written Opinion in PCT/US2017/028526 dated Jul. 17, 2017 (8 pages).
Non-Final Office Action in U.S. Appl. No. 16/096,596 dated May 13, 2019.
Non-Final Office Action on U.S. Appl. No. 15/298,316 dated Jun. 22, 2018 (4 pages).
Notice of Allowance in U.S. Appl. No. 16/095,281 dated Jul. 17, 2020.
Notice of Preliminary Rejection in KR 10-2018-7033915 dated Apr. 7, 2020, with English translation (13 pages).
Office Action in CA Pat Appl No. 2988295 dated Feb. 5, 2018 (4 pages).
Office Action in CA Pat. Appl. 3021632 dated Oct. 3, 2019 (3 pages).
Office Action in JP 2017-563016 dated Jul. 13, 2018 (5 pages, no translation available).
U.S. Office Action in U.S. Appl. No. 14/732,032 dated Dec. 16, 2015 (11 pages).
U.S. Office Action in U.S. Appl. No. 14/732,032 dated May 13, 2016 (14 pages).
PCT International Search Report and Written Opinion dated Jun. 16, 2021 in International Application No. PCT/IB2021/051922.

* cited by examiner

MOLTEN CARBONATE FUEL CELL ANODE EXHAUST POST-PROCESSING FOR CARBON DIOXIDE

CROSS-REFERENCE TO RELATED PATENT APPLICATION

This application is a U.S. National Phase application under 35 U.S.C. § 371 of International Application No. PCT/US2017/028594, filed on Apr. 20, 2017, which claims the benefit of U.S. Provisional Patent Application No. 62/325,711, filed on Apr. 21, 2016, which are hereby incorporated by reference in their entireties.

BACKGROUND

The present disclosure relates to carbon dioxide ($CO_2$) separation in direct molten carbonate fuel cells ("DFC"). In particular, the present disclosure relates to an electrochemical hydrogen separator ("EHS") receiving a $CO_2$-rich anode exhaust stream from a DFC and concentrating the $CO_2$ for sequestration.

In a $CO_2$ separation system for a DFC, the $CO_2$-rich anode exhaust stream also contains water vapor and unused fuel, including mostly hydrogen and carbon monoxide (CO). To make the stream ready for $CO_2$ capture (i.e., separation) for sequestration or use, some processing or post-treatment is required.

SUMMARY

In certain embodiments, a fuel cell system includes a first fuel cell having a first anode and a first cathode, wherein the first anode is configured to output a first anode exhaust gas. The system further includes a first oxidizer configured to receive the first anode exhaust gas and air from a first air supply, to react the first anode exhaust gas and the air in a preferential oxidation reaction, and to output an oxidized gas. The system further includes a second fuel cell configured to act as an electrochemical hydrogen separator ("EHS"). The second fuel cell includes a second anode configured to receive the oxidized gas from the first oxidizer and to output a second anode exhaust gas, and a second cathode configured to output a hydrogen stream. The system further includes a condenser configured to receive the second anode exhaust gas and to separate water and $CO_2$.

In other embodiments, a method of processing fuel cell exhaust includes, at a first oxidizer, receiving a first anode exhaust gas from a first anode of a first fuel cell and air from a first air supply, and outputting an oxidized gas from the first oxidizer. The method further includes, at a second fuel cell having a second anode and a second cathode, receiving the oxidized gas at the second anode, electrochemically separating hydrogen in the oxidized gas, outputting a hydrogen stream from the second cathode, and outputting a second anode exhaust gas from the second anode.

In other embodiments, a fuel cell system includes a fuel cell having an anode and a cathode, wherein the anode is configured to output an anode exhaust gas. The system further includes a condenser configured to receive and condense the anode exhaust gas, to separate water from the anode exhaust gas to form a dried anode exhaust gas, and to separately output the water and the dried anode exhaust gas. The system further includes a pressure swing adsorption unit configured to receive the dried anode exhaust gas, and to output a hydrogen stream and a separate $CO_2$ stream.

In other embodiments, a method of processing fuel cell exhaust includes, at a condenser, receiving anode exhaust gas from an anode of a fuel cell, outputting a dried anode exhaust gas stream, and separately outputting a water stream. The method further includes, at a first compressor, compressing the dried anode exhaust gas stream and outputting a compressed anode exhaust gas stream. The method further includes, at a pressure swing adsorption ("PSA") unit, receiving the compressed anode exhaust gas stream, outputting a hydrogen stream, and separately outputting a $CO_2$ stream.

These and other advantageous features will become apparent to those reviewing the disclosure and drawings.

DETAILED DESCRIPTION

Referring generally to the figures, disclosed herein is a fuel cell subsystem for post-processing fuel cell anode exhaust gas to provide $CO_2$ sequestration.

Conventionally, combustibles in an anode exhaust gas may be reacted in an oxidizer. Oxygen rather than air is supplied to the oxidizer because nitrogen present in air may dilute the $CO_2$ in the anode exhaust gas. An air separation subsystem must be incorporated to provide the necessary oxygen to the oxidizer. However, when using oxygen, water is injected as a coolant in the oxidizer to maintain the oxidizer at a desired temperature level (e.g., to avoid overheating a catalyst). The oxidizer generates an oxidizer exhaust including at least water and $CO_2$. Heat generated in the oxidizer is then used to preheat a cathode inlet stream. After recuperative heat exchange, the anode exhaust/oxidizer exhaust stream is cooled down in a condenser to remove water. A condenser downstream from the oxidizer separates and removes the injected water and any other water present in the exhaust stream, generating oxidizer exhaust with a higher concentration of $CO_2$ ready for sequestration. In one example, when feeding oxygen to an oxidizer in a fuel cell system using greenhouse gas ("GHG") from a pulverized coal ("PC") boiler steam cycle power plant, the $CO_2$ stream for sequestration contains approximately 89% $CO_2$ and 10% water, with 74% fuel utilization. When air is fed to the oxidizer rather than oxygen, the $CO_2$ content is reduced to approximately 58%.

Figure 1:
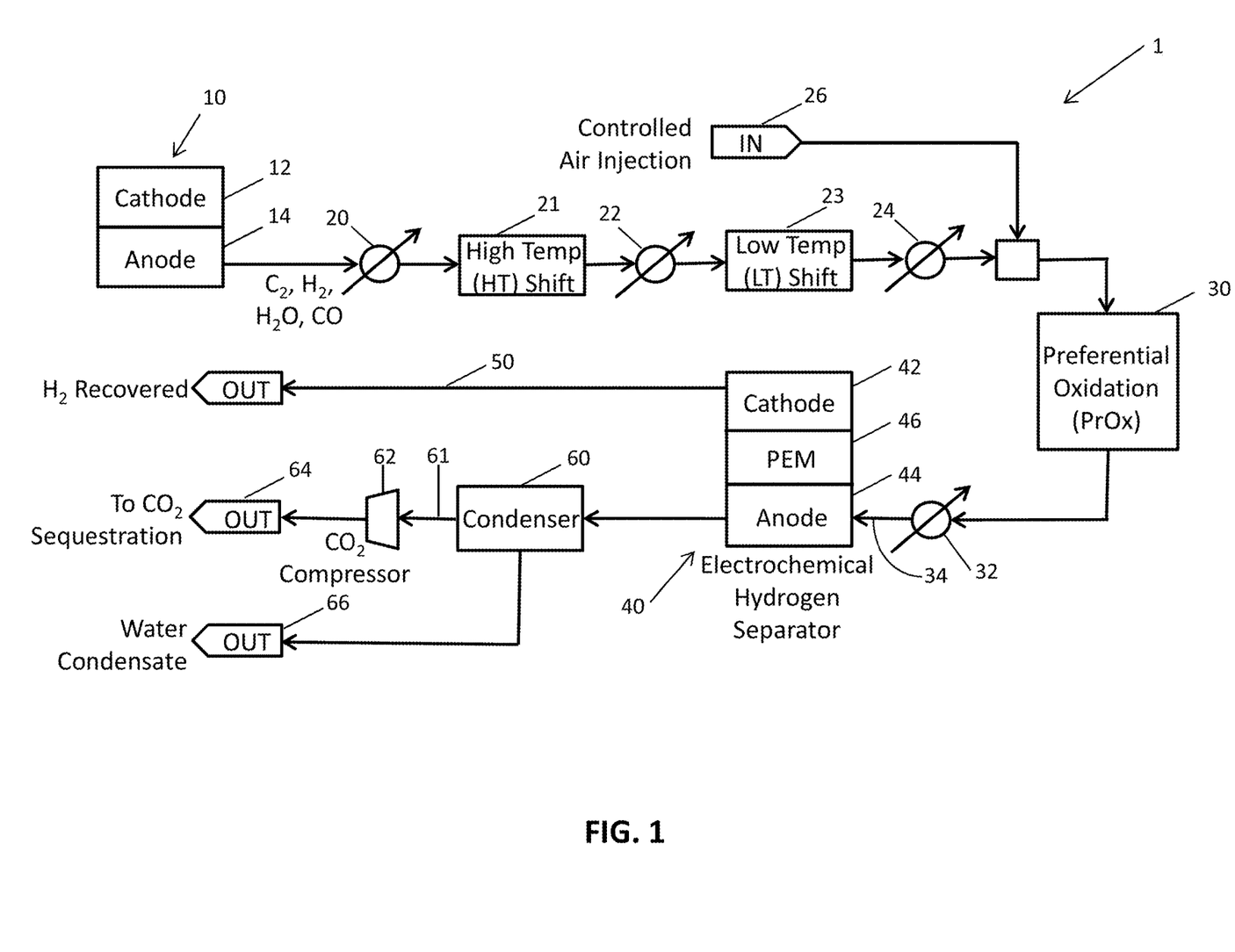
FIG. 1 shows a schematic view of a fuel cell system including a $CO_2$ sequestration subsystem using an electrochemical hydrogen separator, according to an exemplary embodiment.

Referring to FIG. 1, a post-treatment system is shown according to an exemplary embodiment. The process includes recovering hydrogen such that, after providing the required heat to a the cathode inlet stream, excess hydrogen is isolated as a co-product. According to another exemplary embodiment, the excess hydrogen is recycled to a DFC anode as supplementary fuel.

A fuel cell system 1 includes a first fuel cell 10 having a cathode 12 (i.e., a first cathode) and an anode 14 (i.e., a first anode). According to an exemplary embodiment, the first fuel cell 10 may be a DFC. The anode 14 outputs an anode exhaust gas, including at least $CO_2$, hydrogen, water, and CO. A first heat exchanger 20 receives the anode exhaust gas from the DFC and partially cools the anode exhaust gas. The first heat exchanger 20 then outputs a first partially-cooled gas. The first partially-cooled gas is transformed through a high-temperature ("HT") CO shift reaction (e.g., water-gas shift reaction) in a first shift reactor 21, forming a first shifted gas, which is received by a second heat exchanger 22. The first shift reactor 21 is configured to operate at a first temperature in a range of approximately 310° C. to 450° C. The first shift reactor 21 may be configured to shift CO and water into $CO_2$ and hydrogen, such that the first shifted gas has a higher concentration of $CO_2$ and hydrogen than the first partially-cooled gas. The second heat exchanger 22 partially cools the first shifted gas and outputs a second partially-cooled gas. The second partially-cooled gas is transformed through a low-temperature ("LT") CO shift reaction in a second shift reactor 23, forming a second shifted gas, which is received by a third heat exchanger 24. The second shift reactor 23 is configured to operate at a second temperature in a range of approximately 200° C. to 250° C., such that the first temperature is higher than the second temperature. The second shift reactor 23 may be configured to shift CO and water into $CO_2$ and hydrogen, such that the second shifted gas has a higher concentration of $CO_2$ and hydrogen than the second partially-cooled gas. The third heat exchanger 24 cools the second shifted gas to a desired temperature and outputs a cooled gas. According to an exemplary embodiment, the temperature of the cooled gas is based on a range of temperatures acceptable by an oxidizer 30 downstream from the third heat exchanger 24.

The cooled gas is mixed with air, rather than oxygen, which is provided (i.e., injected) by an air supply 26 (i.e., first air supply, controlled air supply, etc.), forming a mixed gas. According to an exemplary embodiment, the air supply 26 may be controlled to establish a preferred ratio of air to any one of $CO_2$, hydrogen, water, and/or CO making up the cooled gas. This preferred ratio may be based on the requirements of the oxidizer. The mixed gas is then fed to the oxidizer 30, which is configured to perform a preferential oxidation reaction for conversion of CO to $CO_2$. Preferential oxidation is a chemical process for removing CO. This process uses a low-temperature shift reactor (e.g., similar to the second shift reactor 23) followed by a staged preferential oxidizer for oxidizing CO using oxygen in the presence of a noble metal catalyst (e.g., platinum, palladium-cobalt, palladium-copper, gold, etc.). The oxidizer 30 outputs an oxidized gas containing $CO_2$ for sequestration and generates heat due to the reaction. A fourth heat exchanger 32 receives the oxidized gas from the oxidizer 30 and cools the oxidized gas, forming, at least in part, an anode inlet stream 34. According to an exemplary embodiment, the oxidizer 30 generates exhaust, separate from the oxidized gas containing $CO_2$. Because exhaust from the oxidizer 30 does not form part of the oxidized gas output, air may be used for the oxidizer, eliminating the need for an air separation unit and/or water injection (e.g., for oxidizer temperature control).

As shown in FIG. 1, the system 1 further includes an EHS 40 (also referred to as a second fuel cell). The EHS 40 includes a cathode 42 (i.e., a second cathode), an anode 44 (i.e., a second anode), and a proton exchange membrane ("PEM") 46 disposed between the cathode 42 and the anode 44. The anode 44 receives the cooled anode inlet stream 34 from the fourth heat exchanger 32. At the anode 44, at least a portion of the hydrogen present in the anode inlet stream 34 is selectively oxidized to positively charge hydrogen ions ($H^+$), which are then transferred to the cathode 42 through the PEM 46. According to an exemplary embodiment the oxidizer 30, the air supply 26, and the heat exchanger 32 may be removed from the system 1 shown in FIG. 1 by incorporating a High Temperature Membrane ("HTM") operating in excess of 150° C. (e.g., as PBI or solid acid membrane) as a PEM. Referring still to FIG. 1, in the cathode 42, $H^+$ is reduced to gaseous hydrogen due to the absence of an oxidant. Therefore, the EHS 40 selectively generates and outputs a hydrogen stream 50 from the anode inlet stream 34. The hydrogen stream 50 is generated as co-product and may be used in the system 1 or exported. According to an exemplary embodiment, each of the shift reactors 21, 23 are configured to maximize hydrogen recovery in the corresponding high-temperature and low-temperature CO shift reactions and prevent carbon monoxide poisoning of an EHS catalyst. According to another exemplary embodiment, the hydrogen stream 50 may be compressed (e.g., electrochemically), with relatively low energy input. Advantageously, the transfer across the PEM 46 utilizes a minimum energy input and does not require any moving parts. According to an exemplary embodiment, the EHS 40 may recover approximately 95% of the hydrogen from the anode exhaust gas from the first fuel cell 10.

The anode 44 of the EHS 40 generates a second anode exhaust gas. The second anode exhaust gas may be fed to a condenser 60, which separates the second anode exhaust gas into a $CO_2$ stream 61 and a water stream (i.e., condensate) 66. The $CO_2$ stream 61 from the condenser 60 is then fed through a $CO_2$ compressor 62 to liquefy at least a portion of the $CO_2$ stream 61, generating a highly concentrated $CO_2$ supply 64 suitable for sequestration and/or export (i.e., transportation) to a point of use (e.g., for food processing). According to an exemplary embodiment, after removal of water in the condenser 60 to the water stream 66, the $CO_2$ stream 61 includes approximately 89% $CO_2$ and approximately 9% water.

Figure 2:
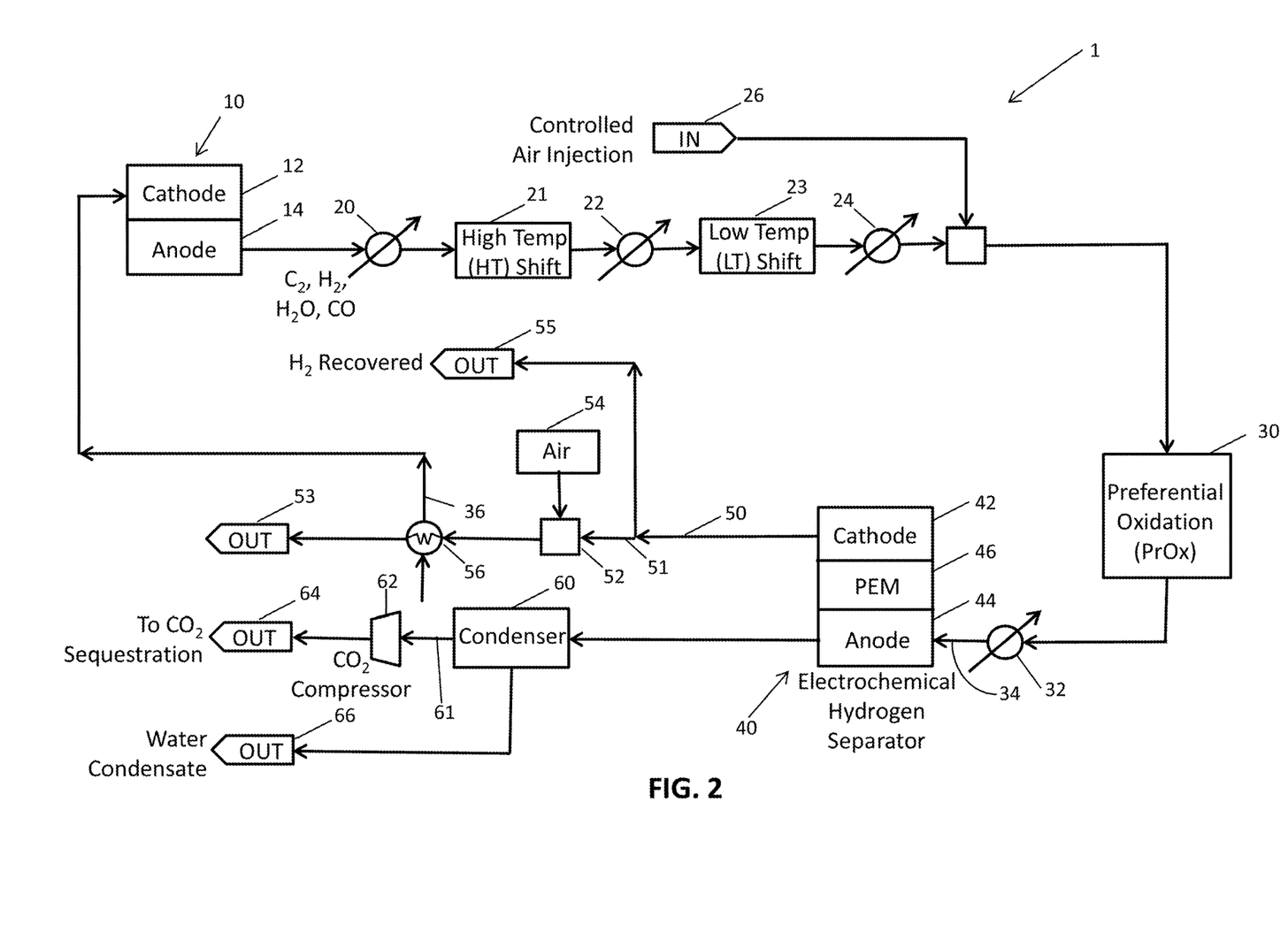
FIG. 2 shows a schematic view of a fuel cell system including a $CO_2$ sequestration subsystem using an electrochemical hydrogen separator, according to another exemplary embodiment.

As shown in FIG. 2, at least a portion of the hydrogen stream 50 may be oxidized using air to generate heat, according to another exemplary embodiment. A first portion 51 of the hydrogen stream 50 generated by the cathode 42 of the EHS 40 is fed to an oxidizer 52 (i.e., a second oxidizer) and is oxidized with air from an air supply 54 (i.e., a second air supply). The oxidization generates an oxidized hydrogen stream 53, including at least heat and water and is fed through a fifth heat exchanger 56. The fifth heat exchanger 56 transfers heat from the oxidized hydrogen stream 53 to preheat a cathode inlet stream 36 (e.g., desulfurized GHG from coal-fueled power plants), received by the first cathode 12 of the first fuel cell 10. According to another exemplary embodiment, the oxidized hydrogen stream 53 may be used to preheat a cathode inlet stream received by the cathode 42 of the EHS 40 or any other cathode. The oxidized hydrogen stream 53 may then be outputted from the system 1.

In the embodiment shown in FIG. 2, the first portion 51 of the hydrogen stream 50 used to heat the cathode inlet stream 36 includes approximately 45% of the hydrogen generated by the cathode 42. The remaining second portion 55 (e.g., approximately 55% of the hydrogen stream 50) is generated as co-product and may be used in the system 1 or exported. The percentage of the hydrogen stream 50 forming each portion 51, 55 may vary according to other exemplary embodiments. According to an exemplary embodiment, the first portion 51 of the hydrogen stream 50 may be limited to an amount necessary to provide a desired level of preheat to the cathode inlet stream 36. According to another exemplary embodiment, the second portion 55 of the hydrogen stream 50 (e.g., hydrogen not fed to the second oxidizer 52 to preheat the cathode inlet stream 36) may be recycled (e.g., fed) to the first anode 14 of the first fuel cell 10, thereby reducing the natural gas fuel input required to operate the first fuel cell 10.

Figure 3:
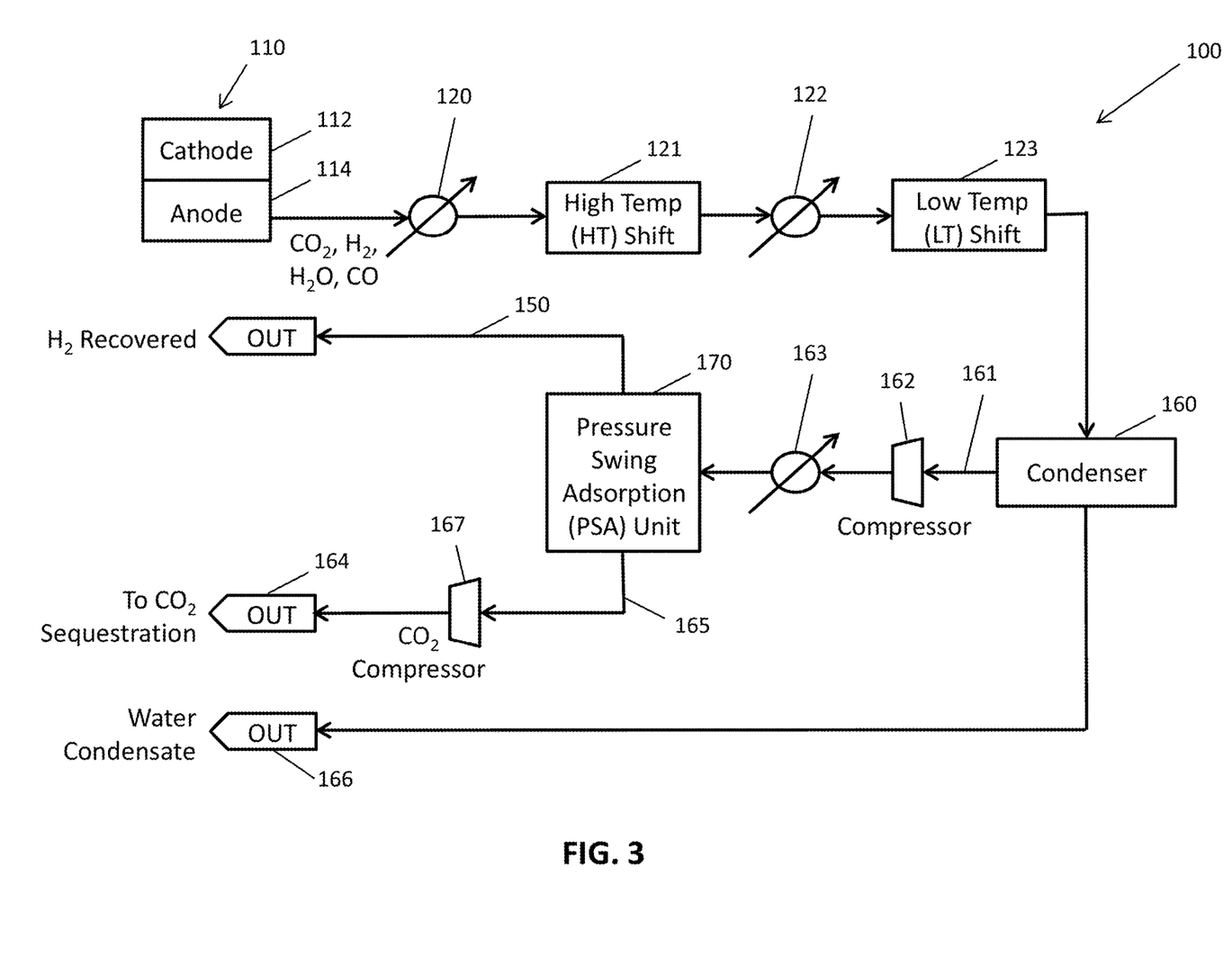
FIG. 3 shows a schematic view of a fuel cell system including a $CO_2$ sequestration subsystem using a pressure swing adsorption unit, according to an exemplary embodiment.

Referring now to FIG. 3, a post-treatment system is shown according to another exemplary embodiment. In this system, as with earlier exemplary embodiments, hydrogen present in anode exhaust gas is separated and recovered.

A fuel cell system 100 includes a fuel cell 110 having a cathode 112 and an anode 114. According to an exemplary embodiment, the fuel cell 110 may be a DFC substantially same as the first fuel cell 10. The anode 114 outputs an anode exhaust gas, including at least $CO_2$, hydrogen, water, and CO. A first heat exchanger 120 receives the anode exhaust gas from the DFC and partially cools the anode exhaust gas. The first heat exchanger 120 outputs a first partially-cooled gas. The first partially-cooled gas is transformed through a high-temperature CO shift reaction in a first shift reactor 121, forming a first shifted gas, which is received by a second heat exchanger 122. The first shift reactor 121 is configured to operate at a first temperature in a range of approximately 310° C. to 450° C. The first shift reactor 121 may be configured to shift CO and water into $CO_2$ and hydrogen, such that the first shifted gas has a higher concentration of $CO_2$ and hydrogen than the first partially-cooled gas. The second heat exchanger 122 partially cools the first shifted gas and outputs a second partially-cooled gas. The second partially-cooled gas is transformed through a low-temperature CO shift reaction in a second shift reactor 123, forming a second shifted gas, which is received by a condenser 160. The second shift reactor 123 is configured to operate at a second temperature in a range of approximately 200° C. to 250° C., such that the first temperature is higher than the second temperature. The second shift reactor 123 may be configured to shift CO and water into $CO_2$ and hydrogen, such that the second shifted gas has a higher concentration of $CO_2$ and hydrogen than the second partially-cooled gas. The condenser 160 separates the second shifted gas into a dried (e.g., dehydrated) anode exhaust gas stream 161, containing at least $CO_2$ and hydrogen, and a separate water stream (i.e., condensate) 166. For example, substantially all of the water is removed from the anode exhaust gas stream when forming the dried anode exhaust gas stream 161. The dried anode exhaust gas stream 161 from the condenser 160 is then fed through a compressor 162, forming a compressed anode exhaust gas stream, which is then fed through a third heat exchanger 163, to further cool the compressed anode exhaust gas stream. According to another exemplary embodiment, the third heat exchanger 163 may be disposed upstream from the compressor 162 (e.g., between the condenser 160 and the compressor 162) and is configured to cool the dried anode exhaust gas stream 161.

The system 100 includes a pressure swing adsorption ("PSA") unit 170. The PSA unit 170 is configured to receive the compressed anode exhaust gas stream from the third heat exchanger 163 and separate the stream into a hydrogen stream 150 and a $CO_2$ stream 165. In the PSA unit 170, the gases other than hydrogen (e.g. mostly $CO_2$ and some water) are adsorbed by an adsorbent bed media at high pressures and a pure hydrogen stream 150 is outputted from the PSA unit 170 at a pressure close to (e.g., substantially the same as) an inlet pressure of the compressed anode exhaust gas stream received at the PSA unit 170. The hydrogen stream 150 is generated as co-product and may be used in the system 100 or exported. After the adsorbent bed media in the PSA unit 170 reaches its maximum adsorbent capacity, it is purged to remove the adsorbed gases, which generate the $CO_2$ stream 165. This purging occurs by de-sorption, accomplished by lowering the pressure to near atmospheric pressure of approximately 20 psia. The $CO_2$ stream 165 is then fed to a $CO_2$ compressor 167 to liquefy at least a portion of the $CO_2$ stream 165, generating a sequestered $CO_2$ supply 164.

Figure 4:
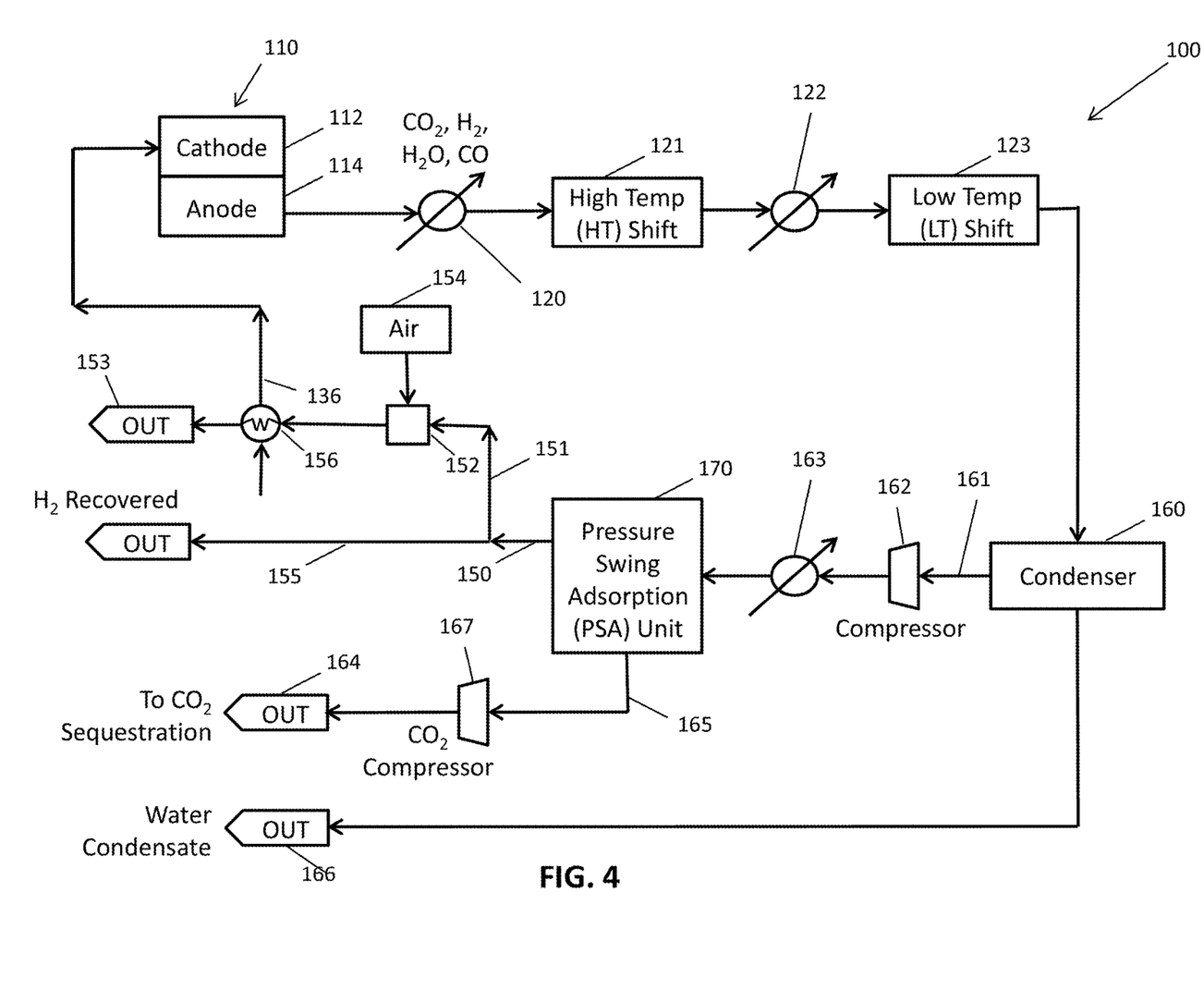
FIG. 4 shows a schematic view of a fuel cell system including a $CO_2$ sequestration subsystem using a pressure swing adsorption unit, according to another exemplary embodiment.

According to an exemplary embodiment, the system 100 may transform a portion of the hydrogen stream 150 in the same way as the hydrogen stream 50 as shown in FIG. 2. For example, as shown in FIG. 4, a first portion 151 of the hydrogen stream 150 generated by the PSA unit 170 is fed to an oxidizer 152 and oxidized with air from an air supply 154. The oxidization generates an oxidized hydrogen stream 153, including at least heat and water and is fed through a fourth heat exchanger 156. The fourth heat exchanger 156 transfers heat from the oxidized hydrogen stream 153 to preheat a cathode inlet stream 136 (e.g., desulfurized GHG from coal-fueled power plants), received by the cathode 112 of the first fuel cell 110. The oxidized hydrogen stream 153 may be outputted from the system 100. Similarly to FIG. 2, the first portion 151 of the hydrogen stream 50 may be limited to an amount necessary to provide a desired level of preheat to the cathode inlet stream 136. According to another exemplary embodiment, a remaining second portion 155 of the hydrogen stream 150 (e.g., hydrogen not fed to the oxidizer 152 to preheat the cathode inlet stream 136) may be recycled (e.g., fed) to the anode 114 of the fuel cell 110, thereby reducing the natural gas fuel input required to operate the fuel cell 110.

With regard to either system 1, 100, according to another exemplary embodiment, a process for sequestering $CO_2$ may include consuming all hydrogen and other combustibles in an oxidizer and utilizing the energy content for preheating a cathode inlet stream.

In certain embodiments, a fuel cell system includes a fuel cell having an anode and a cathode, an oxidizer, and an electrochemical hydrogen separator. The oxidizer is configured to receive anode exhaust gas from the anode and air from a controlled air supply and react the anode exhaust gas and the air in a preferential oxidation reaction. The separator is configured to receive oxidized gas from the oxidizer and to form separate streams of hydrogen and $CO_2$ from the remaining gas. A condenser is configured to receive the $CO_2$ stream from the oxidizer and condense the stream to separate water and liquefy $CO_2$.

In other embodiments, a fuel cell system includes a fuel cell having an anode and a cathode, a condenser, and a pressure swing adsorption unit. The condenser is configured to receive and condense anode exhaust gas from the anode and separate a water stream from the remaining condensed gas. A compressor receives and compresses the remaining condensed gas and feeds compressed gas to the pressure swing adsorption unit. The pressure swing adsorption unit separates a hydrogen stream and a $CO_2$ stream. The $CO_2$ stream is received by a second compressor configured to liquefy $CO_2$.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, the heat recovery heat exchangers may be further optimized.

What is claimed is:

1. A fuel cell system comprising:
   a fuel cell comprising an anode and a cathode, wherein the anode is configured to output an anode exhaust gas;
   a condenser configured to receive and condense the anode exhaust gas, to separate water from the anode exhaust gas to form a dried anode exhaust gas, and to separately output the water and the dried anode exhaust gas;
   a pressure swing adsorption unit configured to receive the dried anode exhaust gas and to output a hydrogen stream and a separate $CO_2$ stream;
   an oxidizer configured to receive a first portion of the hydrogen stream from the pressure swing adsorption unit and air from an air supply, and to output an oxidized hydrogen stream; and
   a heat exchanger configured to receive and transfer heat from the oxidized hydrogen stream to a cathode inlet stream received by the cathode.

2. The fuel cell system of claim 1, further comprising a compressor configured to receive and liquefy the $CO_2$ stream from the pressure swing adsorption unit.

3. The fuel cell system of claim 1, wherein the anode is configured to receive a second portion of the hydrogen stream.

4. The fuel cell system of claim 1, wherein the heat exchanger is a third heat exchanger, the fuel cell system further comprising:
   a first heat exchanger configured to receive and cool the anode exhaust gas and output a first partially-cooled gas;
   a first CO shift reactor configured to receive the first partially-cooled gas, to perform a first CO shift reaction at a first temperature on the first partially-cooled gas, and to output a first shifted gas;
   a second heat exchanger configured to receive and cool the first shifted gas, and to output a second partially-cooled gas; and
   a second CO shift reactor configured to receive the second partially-cooled gas, to perform a second CO shift reaction at a second temperature on the second partially-cooled gas, and to output a second shifted gas;
   wherein the anode exhaust gas received at the condenser is the second shifted gas output from the second CO shift reactor; and
   wherein the first temperature is higher than the second temperature.

5. A method of processing fuel cell exhaust, comprising:
   at a condenser, receiving anode exhaust gas from an anode of a fuel cell, outputting a dried anode exhaust gas stream, and separately outputting a water stream;
   at a first compressor, compressing the dried anode exhaust gas stream and outputting a compressed anode exhaust gas stream;
   at a pressure swing adsorption (PSA) unit, receiving the compressed anode exhaust gas stream, outputting a hydrogen stream, and separately outputting a $CO_2$ stream;
   at an oxidizer, receiving a first portion of the hydrogen stream and air from an air supply and outputting an oxidized hydrogen stream; and
   at a heat exchanger, transferring heat from the oxidized hydrogen stream to a cathode inlet stream received in a cathode.

6. The method of claim 5, further comprising, at a second compressor, receiving the $CO_2$ stream from the PSA unit and outputting liquefied $CO_2$.

7. The method of claim 5, wherein the heat exchanger is a third heat exchanger, the method further comprising:
   at a first heat exchanger, cooling the anode exhaust gas and outputting a first partially-cooled gas;
   at a first CO shift reactor, performing a first CO shift reaction at a first temperature on the first partially-cooled gas and outputting a first shifted gas;
   at a second heat exchanger, cooling the first shifted gas and outputting a second partially-cooled gas; and
   at a second CO shift reactor, performing a second CO shift reaction at a second temperature on the second partially-cooled gas and outputting a second shifted gas;

wherein the anode exhaust gas received at the condenser is the second shifted gas output from the second CO shift reactor; and wherein the first temperature is higher than the second temperature.

8. The method of claim 5, further comprising cooling at least one of the dried anode exhaust gas stream or the compressed anode exhaust gas in a heat exchanger.

* * * * *